(12) United States Patent
Strongin

(10) Patent No.: US 6,679,927 B2
(45) Date of Patent: *Jan. 20, 2004

(54) DOG BONE TOY WITH VARIABLE SOUND EMITTERS

(75) Inventor: Ned Strongin, New York, NY (US)

(73) Assignee: Hands On Toys, Inc., Wilmington, MA (US)

(*) Notice: Subject to any disclaimer, the term of this patent is extended or adjusted under 35 U.S.C. 154(b) by 128 days.

This patent is subject to a terminal disclaimer.

(21) Appl. No.: 09/982,673

(22) Filed: Oct. 18, 2001

(65) Prior Publication Data

US 2002/0129774 A1 Sep. 19, 2002

Related U.S. Application Data

(60) Provisional application No. 60/241,606, filed on Oct. 20, 2000.

(51) Int. Cl.$^7$ ............................ A63H 5/00; A63H 3/31
(52) U.S. Cl. ...................... 44/213; 446/397; 446/188; 446/203; 446/218
(58) Field of Search ........................ 446/213, 397, 446/188, 203, 218, 175, 404, 409; 119/702–711

(56) References Cited

U.S. PATENT DOCUMENTS

| | | | | |
|---|---|---|---|---|
| 801,062 A | * | 10/1905 | Clark | 446/409 |
| 2,003,958 A | * | 6/1935 | Salisbury | 119/709 |
| 4,750,745 A | * | 6/1988 | Benham | 473/514 |
| 5,112,055 A | * | 5/1992 | Barnhill | 473/199 |
| 5,590,875 A | * | 1/1997 | Young | 473/457 |
| 6,068,534 A | * | 5/2000 | Strongin | 446/213 |
| 6,123,599 A | * | 9/2000 | Chiang | 446/397 |

* cited by examiner

*Primary Examiner*—Derris H. Banks
*Assistant Examiner*—Faye Francis
(74) *Attorney, Agent, or Firm*—Brian M. Dingman, Esq.; Mirick, O'Connell, DeMallie & Lougee, LLP

(57) ABSTRACT

A toy which emits sounds as it is moved, comprising: a toy body; and a plurality of mechanically-operated sound tubes carried within the toy body, each sound tube including a sliding whistle which moves along the tube by the force of gravity, and each sound tube lying along a longitudinal axis, in which the axes are transverse to one another, so that the sound tubes emit sound when the toy is moved along various axes.

6 Claims, 1 Drawing Sheet

DOG BONE TOY WITH VARIABLE SOUND EMITTERS

CROSS REFERENCE TO RELATED APPLICATION

This application claims priority of Provisional application serial No. 60/241,606, filed on Oct. 20, 2000.

FIELD OF THE INVENTION

This invention relates to toys which make sound when they are moved. The sound is produced by a plurality of devices embedded in the toy, each of which mechanically produces sound as the toy moves. The toy is in the shape of a dog bone. The toy does not require a battery power source.

BACKGROUND OF THE INVENTION

A hollow plastic baseball with external openings to allow air flow therethrough (a WHIFFLE type ball) carrying a single sound-producing tube (hereinafter a "sound tube"), is disclosed in U.S. Pat. No. 5,590,875. The subject ball includes a single sound tube, and sound is produced by the tube only when the sliding whistle is moved along the tube by gravity, or by the forces involved in throwing the ball. Accordingly, the ball will emit noise only when the tube is properly oriented relative to the ground, or thrown in a manner to create movement of the sliding whistle. The result is that the ball will only emit substantial amounts of sound if it is handled purposefully so as to create the sound. However, such particular handling requirements defeats the purpose of a ball, which is to allow free play therewith. Accordingly, that ball is unsatisfactory for a play ball which emits playful or fanciful sounds.

SUMMARY OF THE INVENTION

The sound-producing devices used in this invention preferably include a movable member which is moved by gravity as the orientation of the member changes by reason of movement of the toy. These sound-producing devices may be oriented such that the movement of the movable members of the devices occurs along transverse axes, which increases the likelihood of sound occurrence, regardless of the manner in which the toy is moved. For example, three sound-producing devices can be arranged along substantially orthogonal axes, which ensures that sound will be produced upon virtually any rolling motion of the toy.

This invention features a toy which emits sounds as it is moved, comprising: a toy body; and a plurality of mechanically-operated sound tubes carried within the toy body, each sound tube including a sliding whistle which moves along the tube by the force of gravity, and each sound tube lying along a longitudinal axis, in which the axes are transverse to one another, so that the sound tubes emit sound when the toy is moved along various axes.

In a preferred embodiment, there are three said sound tubes, and the three axes are orthogonal. The toy is preferably generally in the shape of a "dog bone", with an elongated central section and bulbous sections at each end thereof, each shaped generally as a thick disk, and the ends of each sound tube are located at the toy surface in an indented area, to inhibit the sound tubes from contacting a surface against which the toy is contacted.

Preferably, the sound tubes are entirely embedded within the toy body, and the ends of each sound tube are exposed to free air. The toy body may be hollow, and made from a pliable material. In that case, the toy may further include means for tightly holding the ends of each sound tube proximate the surface of the toy body, which may be accomplished with a lip formed in the toy body, which partially overlays the end of each sound tube. The lip may lie below the apparent surface of the toy body, to inhibit the ends of the tubes from contacting a surface against which said toy is contacted.

In a preferred embodiment, this invention features a toy which emits sounds as it is moved, comprising: a toy body of generally a dog-bone shape; and three substantially orthogonal mechanically-operated sound tubes carried within said toy body, each said sound tube including a sliding whistle which moves along said tube by the force of gravity, and each said sound tube lying along a longitudinal axis, in which said axes are substantially orthogonal to one another, so that said sound tubes emit sound when said toy is moved along various axes; wherein said toy body includes six indented areas, and in which the ends of each said sound tube are located at the toy surface in an indented area, to inhibit the sound tubes from contacting a surface against which said toy is contacted.

In a more specific embodiment, this invention features a toy which emits sounds as it is moved, comprising: a hollow toy body made from a pliable material; and three substantially orthogonal mechanically-operated sound tubes carried within said toy body, each said sound tube including a sliding whistle which moves along said tube by the force of gravity, and each said sound tube lying along a longitudinal axis, in which said axes are substantially orthogonal to one another, so that said sound tubes emit sound when said toy is moved along various axes; wherein said toy body includes six indented areas, and in which the ends of each said sound tube are located at the toy surface in an indented area, to inhibit the sound tubes from contacting a surface against which said toy is contacted; wherein said toy body includes a lip below its apparent surface, said lip partially overlaying the ends of each said sound tube, to tightly hold the ends of said sound tubes proximate said surface at said indented areas.

BRIEF DESCRIPTION OF THE DRAWINGS

Other objects, features and advantages will occur to those skilled in the art from the following description of the preferred embodiment, and the accompanying drawings, in which.

DESCRIPTION OF THE PREFERRED EMBODIMENT

Figure 1A:
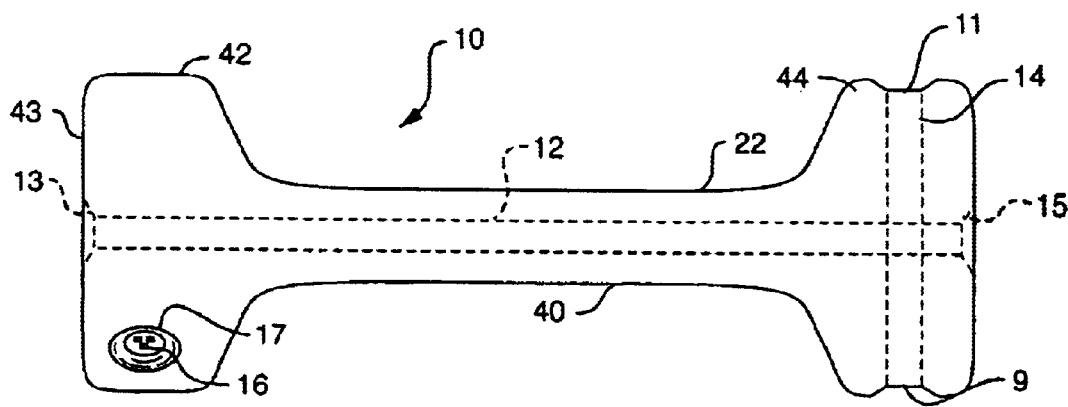
FIG. 1A is a side view of the preferred embodiment of this invention.
Figure 1B:
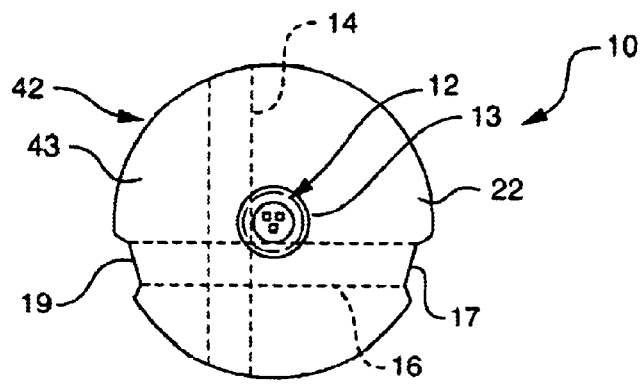
FIG. 1B is an end view of embodiment of FIG. 1A.

There is shown in FIG. 1, toy 10 according to this invention. Toy 10 includes plastic toy body 22, which can be made hollow or solid, as desired. Shown in the drawings is a body 22 which is molded of a relatively soft PVC plastic material, about 2 mm thick.

Toy 10 includes three identically-operating mechanical sound-producing devices 12, 14 and 16. Devices 12, 14, and 16 are hollow tubes with sliding cylindrical whistles (such as whistle 40, FIG. 2), which produce sound with a reed through which air passes as the whistle slides along the tube.

Sound-producing devices of this type are depicted in U.S. Pat. No. 5,590,875. In the preferred embodiment shown in the drawings, the tubes of devices 12, 14 and 16 lie along substantially orthogonal axes (within the tolerances required in rotational molding of a toy such as this), although this invention contemplates two or more of any kind of mechanical sound producing devices arranged such that the sound producing movement of the devices occurs along transverse, as opposed to parallel, axes. There is no limitation to sound tubes as the mechanical sound producing devices or to the arrangement of the sound producing devices. The transverse arrangement increases the likelihood of sound occurrence, regardless of the motion of the toy with respect to the axis of the movement of the movable member of any one particular sound-producing device.

The end of each sound tube is preferably located below the surrounding toy surface (i.e., the surface the toy would have if it did not include conical depressions), so that the toy can move with little impedance from the sound tubes. Thus, toy body 22 has depressions 9, 11, 13, 15, 17 and 19 (preferably conical) leading from the surface of body 22 down to the exposed end of devices 14, 12 and 16, respectively.

Figure 2:
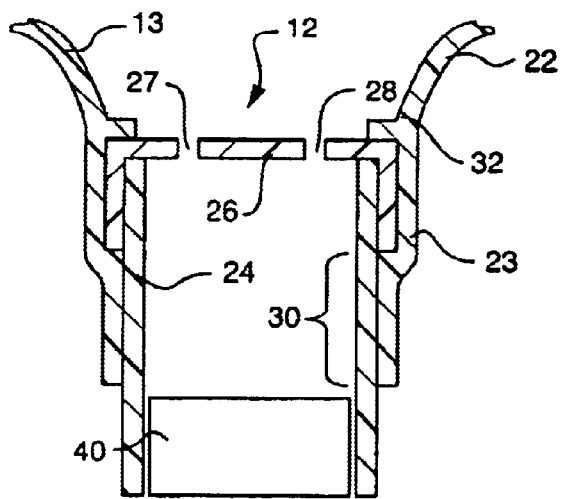
FIG. 2 is an enlarged, partial, cross-sectional view of a sound producing device and the manner in which it is secured in the preferred embodiment of the toy of this invention.

The preferred manner in which the tubes are held in the toy is shown in FIG. 2. Sound tube 12 includes tube 24 with end-cap 26 secured with adhesive across the open end of tube 24. Tube 24 and cap 26 are also made of PVC. Cap 26 has holes 27, 28, which allow movement of air into and out of tube 24, and also allow sound produced by sliding whistle 40 to escape from tube 24.

Toy body 22 is preferably made from a relatively soft PVC plastic material, preferably by molding. Lip 32 is formed in body 22, to partially overlay cap 26, which helps to maintain sound tube 12 within toy body 22. Toy body 22 also has inwardly protruding tubular section 23, which is sized and shaped to very tightly fit over sound tube 12, as shown in the drawing. To assist in maintaining sound tube 12 in body 22, an adhesive can be applied to tube 24 in area 30, to bond body 22 to tube 24. This also helps to maintain positive air pressure within toy body 22, if such is desired. These features together comprise the preferred means to tightly hold the ends of the sound tubes proximate the surface of the toy body.

The preferred shape of the toy of this invention is best shown in FIG. 1A, and is generally a "dog bone", with elongated tubular central portion 40 integrally connected to end portions 42 and 44, each of which is generally a thick disk. This allows the toy to be rolled while in the position shown in FIG. 1A.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A toy which emits sounds as it is rolled, comprising:
  a generally dog-bone shaped toy body; and
  three substantially orthogonal mechanically-operated sound tubes carried within said toy body, each said sound tube including a sliding whistle which moves along said tube by the force of gravity, and each said sound tube lying along a longitudinal axis, in which said axes are substantially orthogonal to one another, so that said sound tubes emit sound when said toy is moved along various axes; wherein said toy body includes six indented areas, and in which the ends of each said sound tube are located at the toy surface in an indented area, to inhibit the sound tubes from contacting a surface against which said toy is contacted.

2. The toy of claim 1 in which said toy body is hollow, and is made from a pliable material.

3. The toy of claim 2, further including means for tightly holding the ends of each said sound producing device proximate the surface of said toy body.

4. The toy of claim 3 in which said means for tightly holding includes a lip formed in said toy body, which partially overlays the end of said sound producing device.

5. The toy of claim 4, in which said lip lies below the apparent surface of said toy body, to inhibit the ends of said sound producing devices from contacting a surface against which said toy is contacted.

6. A toy which emits sounds as it is moved, comprising:
  a hollow toy body made from a pliable material; and
  three substantially orthogonal mechanically-operated sound tubes carried within said toy body, each said sound tube including a sliding whistle which moves along said tube by the force of gravity, and each said sound tube lying along a longitudinal axis, in which said axes are substantially orthogonal to one another, so that said sound tubes emit sound when said toy is moved along various axes; wherein said toy body includes six indented areas, and in which the ends of each said sound tube are located at the toy surface in an indented area, to inhibit the sound tubes from contacting a surface against which said toy is contacted;
  wherein said toy body includes a lip below its apparent surface, said lip partially overlaying the ends of each said sound tube, to tightly hold the ends of said sound tubes proximate said surface at said indented areas.

* * * * *